United States Patent [19]

Shepherd et al.

[11] 3,796,556
[45] Mar. 12, 1974

[54] MANUFACTURE OF WELDED GLAZING UNITS

[75] Inventors: Gerald Shepherd, St. Helens; James Berry Higham, Eccleston Park, both of England

[73] Assignee: Pilkington Brothers Limited, Liverpool, England

[22] Filed: May 25, 1972

[21] Appl. No.: 256,861

[30] Foreign Application Priority Data
May 28, 1971 Great Britain............... 17976/71

[52] U.S. Cl............................. 65/40, 65/58, 65/156
[51] Int. Cl............................................ C03b 23/20
[58] Field of Search............ 65/DIG. 8, 40, 58, 152, 65/156

[56] References Cited
UNITED STATES PATENTS
2,428,969   10/1947   Guyer................................ 65/111 X
3,628,935   12/1971   Jansson et al...................... 65/40

Primary Examiner—Arthur D. Kellogg
Attorney, Agent, or Firm—Sughrue, Rothwell, Mion, Zinn & Macpeak

[57] ABSTRACT

In the manufacture of multiple glazing units, such as double glazing units, edge regions of at least one glass sheet are heated by passage of alternating electric current to weld the edge regions of adjacent sheets together. The current is passed continuously along two separate conducting paths through the glass, the currents in the two paths having an angular phase displacement relative to each other. The voltage used may be fixed and the phase displacement variable. Alternatively the phase displacement may be fixed and the voltage variable.

6 Claims, 4 Drawing Figures

MANUFACTURE OF WELDED GLAZING UNITS

BACKGROUND OF THE INVENTION

This invention relates to a method of peripherally welding glass parts by the passage of electrical heating currents, during the manufacture of multiple glazing units, e.g. a double glazing unit.

Though the parts which are to be welded are usually composed of glass they may also be made from any suitable vitreous material.

For the purposes of this specification the term "aspect ratio" is defined in relation to the length and width of a rectangular double glazing unit such that:

aspect ratio = length of unit/width of unit

Hence for a square unit the aspect ratio is one.

It is well known in the art of manufacturing double glazing units to place two sheets of glass (or other vitreous material) in spaced relation, one above the other, and to apply a conductive stripe to a periphery of at least one of the sheets, usually the upper surface of the upper sheet. Electrical heating currents are passed through the conductive stripe in order to melt the glass along a margin so causing the glass lying beneath the stripe to sag and coalesce with the periphery of the other glass sheet. At a certain temperature, after the glass has become molten, the stripe burns off and conduction occurs through the molten glass itself. When a satisfactory weld has been obtained the passage of electric current is ceased and, after further post treatment stages, the unit is ready for use.

In one such method of welding glass sheets, current is passed through a stripe corresponding to one edge of the proposed double glazing unit. After reaching a preset value the current is tripped out and applied to another stripe; this procedure being continued until fusion of the edges of both glass sheets has been attained. With units of high aspect ratio some conduction, at each stage, occurs through the other three sides with the result that one side may not attain the desired temperature.

Another method of welding, which reduces the effects of non-uniform conductivity, involves passing current alternately across each pair of diagonal corners of the proposed double glazing unit. All four sides of the unit are subjected to the same voltage which is rapidly switched from one pair of diagonal corners to the other. The four sides of the unit effect two electrically parallel paths through which current flows simultaneously. On reaching a preset level the current is switched to the other pair of diagonal corners and the procedure is repeated until a satisfactory weld has been obtained. However, it has now been found that particularly with units having an aspect ratio greater than 1.5, differences in the conductivities of the electrical paths may produce a situation where the current is preferentially diverted to three of the four sides of the proposed unit. In this event additional current may be passed to the side excluded from the total effect of the current but such a procedure is time consuming and expensive.

It is to be appreciated that both of the aforementioned processes are discontinuous since they involve the switching of applied current from one set of contacts to another set of similar contacts whether these be positioned on one side or at opposite corners of a proposed double glazing unit.

SUMMARY OF THE INVENTION

According to this invention a method of peripherally welding parts of vitreous material comprises heating regions of at least one of the parts to produce a weld uniting the parts, the heating of said regions being effected by passing alternating electrical heating currents through the regions along two electrical paths, the alternating electrical heating currents being passed continuously along their respective paths and the current passed along one of the paths having an angular phase displacement with respect to the current passed along the other path.

In particular, the invention may be applied to the manufacture of a multiple glazing unit, e.g. a double glazing unit. In one form of the invention the parts are rectangular glass sheets and two alternating voltages, displaced in phase, are applied to diagonally opposed corners of one of the glass sheets, the magnitudes of each voltage being individually variable and selected to produce a satisfactory peripheral weld of the glass sheets. It is usual to have alternating voltages of fixed magnitude and to vary the phase displacement according to the aspect ratio of the sheets undergoing the welding process. However, when using alternating voltages having very acute angular phase displacements i.e. phase displacements of the order of 15°, the method of determining the supply of energy to the edges of the unit solely by variation of the angular phase displacement, may become rather insensitive and unsatisfactory welds may ensue. Consequently, with sheets having aspect ratios which require acute angular phase displacements, it may be preferable to adjust the angular phase displacement to some appropriate constant value and to control the supply of energy flowing in the edges of the sheets by adjustment of the magnitudes of the individual alternating voltages. For sheets requiring less acute angular phase displacements, e.g. 90° or 120°, slight adjustment of the magnitudes of the voltages may still be desirable in order to finely adjust or trim the supply of energy to the sheets undergoing the welding process.

Since uniform heating of proposed units of high aspect ratio can be attained by suitable adjustment of the phase displacement of the alternating voltages, this method of welding is not limited to the production of units of low aspect ratio (i.e. units having aspect ratios of less than 1.5).

With reference to the phase angle ($\theta$) between the two alternating voltages which are required for welding the proposed double glazing units, an equation has been deduced which relates the phase angle ($\theta$) to the aspect ratio of the unit.

This equation is:

$$\tan(\theta)/(2) \, \alpha \, \text{Aspect ratio}$$

DESCRIPTION OF THE PREFERRED EMBODIMENTS

Figure 1:
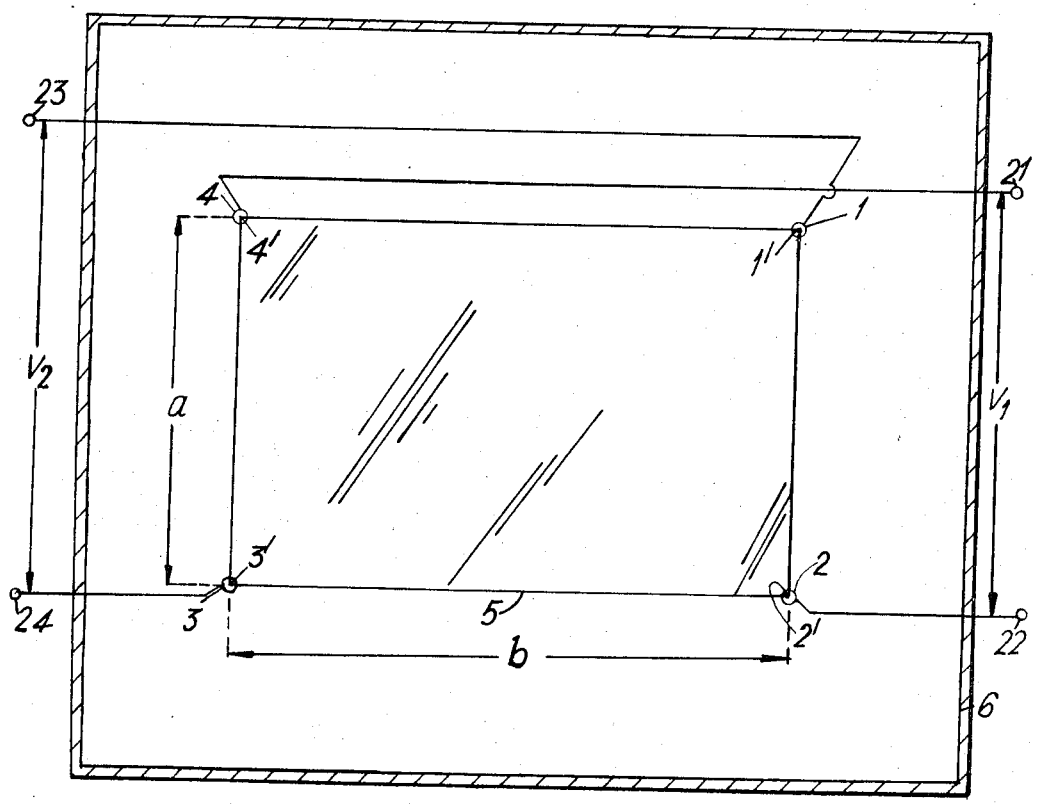
FIG. 1 indicates how alternating voltages $V_1$ and $V_2$ are applied across diagonally opposed corners of the upper sheet.

Referring to FIG. 1, there is shown the upper sheet of a pair of glass sheets disposed one above the other and which constitute a proposed double glazing unit 5. The proposed unit resides within a welding station or furnace 6. The temperature within the welding station 6 is maintained at about 480° C. Power may be supplied to the proposed unit 5 to be welded, whilst it lies in the welding station 6 by means of contacts 1, 2, 3, 4 connecting the corners 1', 2', 3', 4' of the proposed unit to a two phase electrical supply situated outside the welding station. As shown in FIG. 1, the electrical supply applies alternating voltages $V_1$ and $V_2$ across diagonally opposite corners of the proposed unit, and in this example, the phase at voltage $V_2$ is applied across corners 1' and 3' and the other phase at voltage $V_1$ is applied across corners 2' and 4'.

Circuits which generate alternating voltages of the required phase displacement will now be described, by way of example, with reference to FIGS. 2 to 4.

Figure 2:
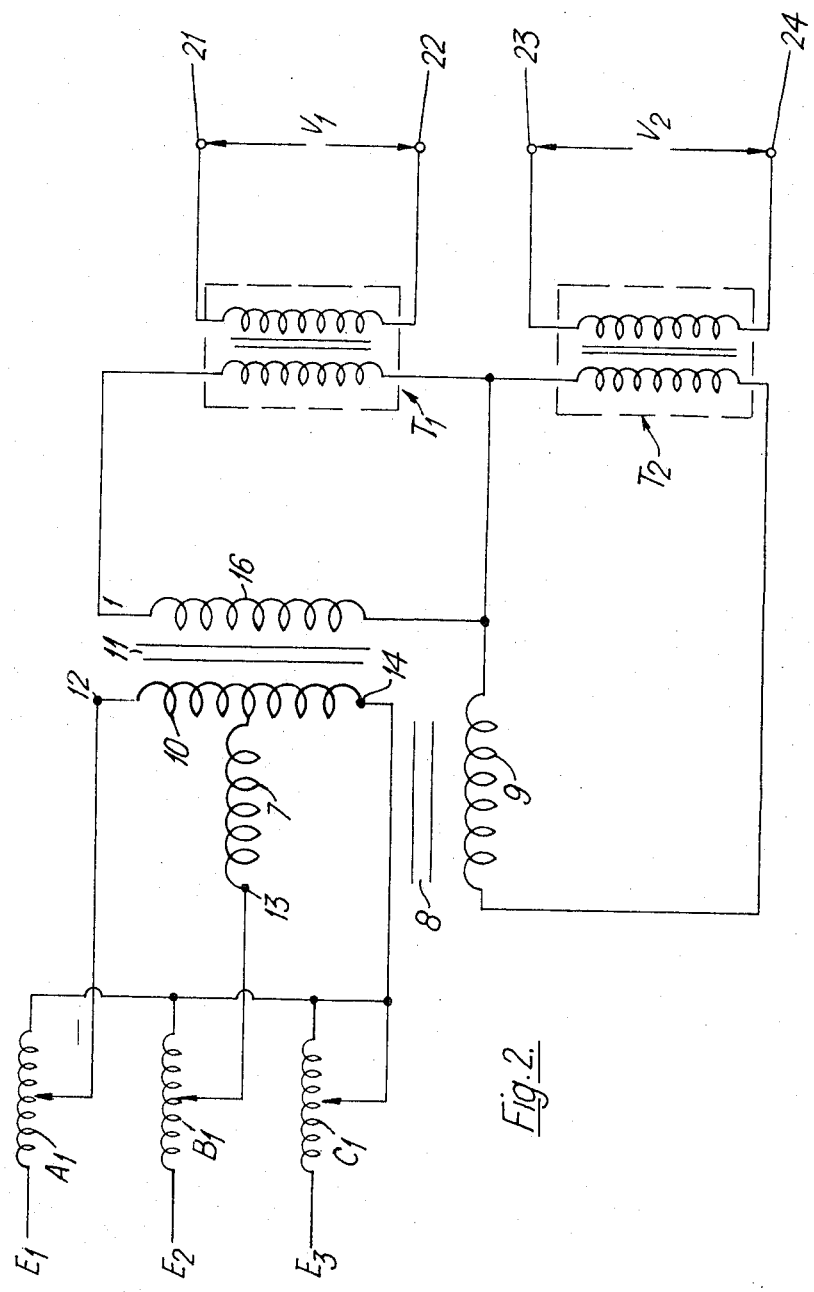
FIG. 2 is a circuit diagram for the production of alternating voltages $V_1$ and $V_2$ having a phase displacement of 90°.

FIG. 2 shows a method of converting a three phase system of voltage to a two phase supply by means of transformers arranged in a Scott or T-connection. This arrangement incorporates two identical, single phase transformers referred to as the main and teaser transformers. The main transformer comprises a primary coil 10, a core 11 and a secondary coil 16, the midpoint of the windings of coil 10 being attached to one end of the primary coil 7 of the teaser transformer, said teaser transformer also incorporating a core 8 and a secondary coil 9.

In practice, balanced three phase line voltages $E_1$, $E_2$ and $E_3$ are applied individually through three controlling auto-transformers $A_1$, $B_1$ and $C_1$, to the Scott-connected transformers at terminals 12, 13 and 14. Voltages produced in the main and teaser transformers are in quadrature and these voltages may be increased to values $V_1$ and $V_2$ by two step-up transformers $T_1$ and $T_2$. The output voltages $V_1$ and $V_2$ are also in phase quadrature and are applied to diagonally opposite corners of a proposed double glazed unit by means of contacts 21 and 22 and 23 and 24 respectively. With a phase angle of 90° the aspect ratio, according to the previously mentioned relation, would be unity i.e. the proposed double glazing unit would be a square one. Though a phase angle of 90° ideally produces an optimum weld in a square unit, satisfactory welding of units having aspect ratios slightly different from one, may be obtained with voltages having a phase displacement of 90°.

Figure 3:
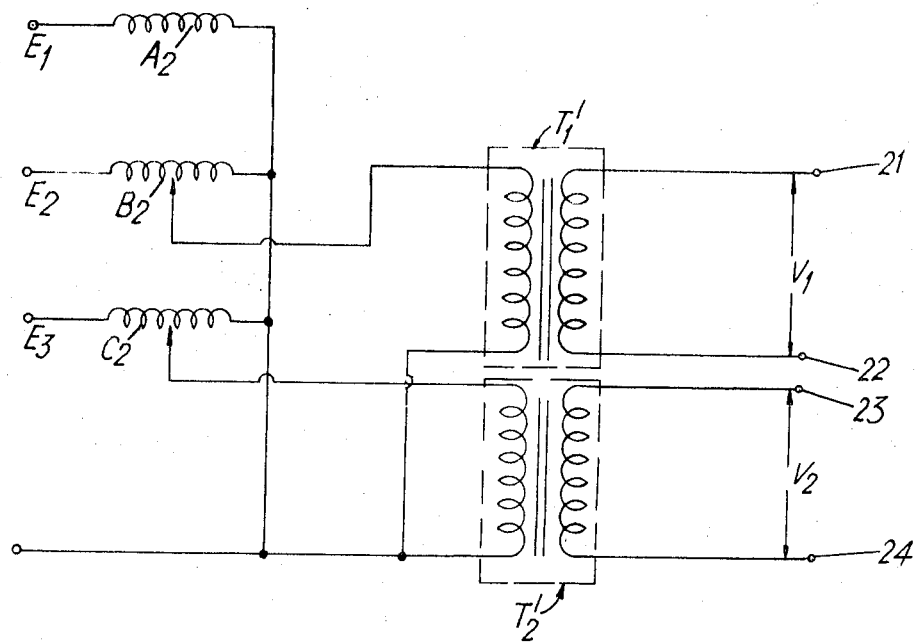
FIG. 3 is a circuit diagram for the production of alternating voltages $V_1$ and $V_2$ having a phase displacement of 120°.

FIG. 3 shows a method of obtaining from a three phase supply two alternating voltages $V_1$ and $V_2$ having a phase displacement of 120°. A fixed auto-transformer $A_2$ and variable auto-transformers $B_2$ and $C_2$ are used to control the input voltage to two identical step-up transformers $T_1'$ and $T_2'$ which supply a proposed double glazing unit with voltages $V_1$ and $V_2$ through the contacts 21 and 22 and 23 and 24. With a phase angle of 120° the predicted optimum aspect ratio is 1.732. Welding of units having an aspect ratio of this value and of aspect ratios approximating to this value, is found to be efficiently performed by alternating voltages having a phase displacement of 120°.

Figure 4:
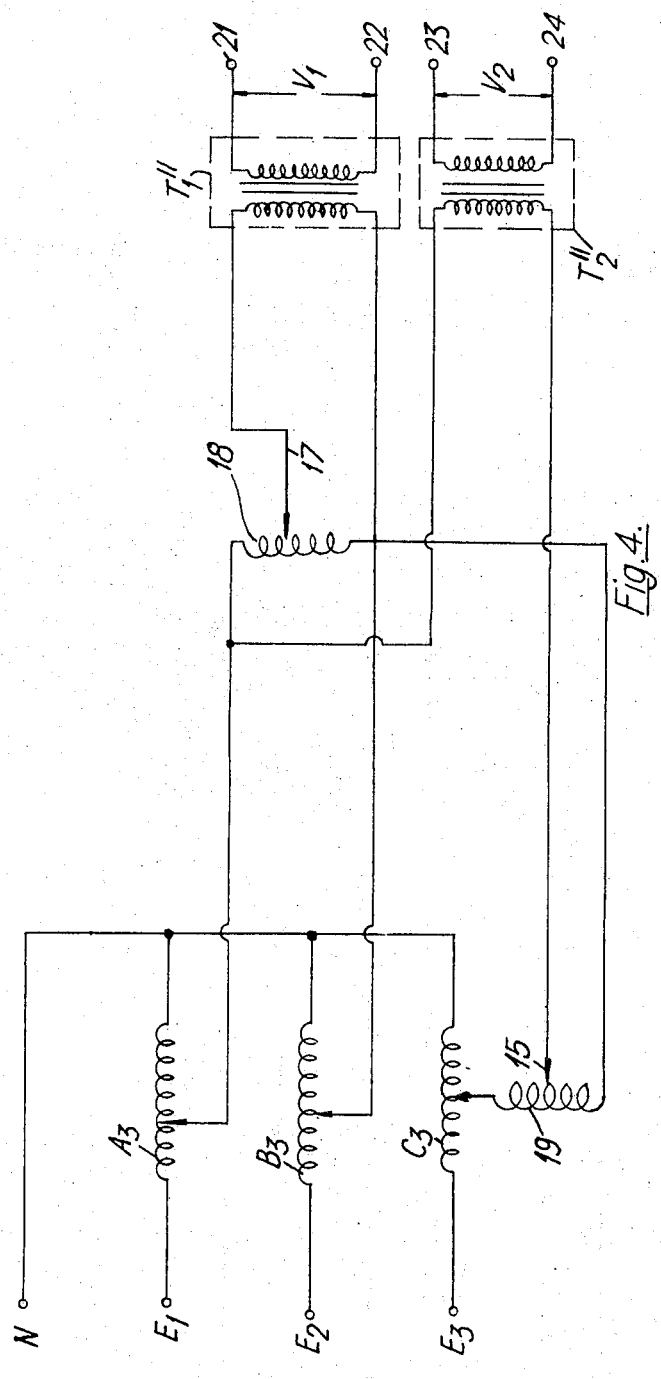
FIG. 4 is a circuit diagram for the production of alternating voltages $V_1$ and $V_2$ having a phase angle variable between 0° and 60°.

FIG. 4 shows a means of obtaining, from a three phase supply, two alternating voltages $V_1$ and $V_2$ having a phase angle which may be varied between 0° and 60°. Auto-transformers $A_3$, $B_3$, and $C_3$ control the input to two step-up transformers $T_1''$ and $T_2''$ which supply alternating voltages $V_1$ and $V_2$ to contacts 21 and 22 and 23 and 24 respectively. The phase of $V_1$ with respect to $V_2$ may be varied within the range 0° to 60° by means of a slidable contact 15 movable along an auto-transformer 19. Output voltage $V_1$ is matched with $V_2$ by movement of a slidable contact 17 along an auto-transformer 18. Voltages of the desired magnitudes and having appropriate phase displacement may then be applied to the proposed unit by means of the contacts 21, 22, 23 and 24. Units of different aspect ratios may be successfully welded by adjustment of the aforementioned circuit to provide voltages of the required phase displacement. Efficient welding of units with aspect ratios as high as eight may be effected with this technique and units of even higher aspect ratios may be manufactured by applying voltages having a suitable phase displacement.

The power output required from all the circuits previously mentioned is dependent on the welding process itself and for this reason the components of the circuits may be substituted by other components more suited to the power requirements of a given welding process. For example, maintenance of a steady voltage may be automatically controlled by the use of induction regulators. However, other devices which provide for voltage adjustment may be used and voltage regulation need not be restrained to methods involving moving coil instruments.

We claim:

1. A method of peripherally welding rectangular glass sheets in a multiple glazing unit, which method comprises heating peripheral regions of at least one glass sheet to produce a weld uniting the sheets, the heating of said regions being effected by applying continuously two alternating voltages, displaced in phase, to diagonally opposed corners of one of the glass sheets, whereby alternating electrical heating currents are passed through the said regions along two electrical paths, the alternating electrical heating currents being passed continuously along their respective paths and the current passed along one of the paths having an angular phase displacement with respect to the current passed along the other path.

2. A method according to claim 1, wherein the applied voltages are of individually variable magnitudes, the angular phase displacement being maintained at a selected constant value.

3. A method according to claim 2, wherein the phase displacement is 15°.

4. A method according to claim 1, wherein the applied voltages are of fixed magnitudes, the phase displacement being selected to correspond with the aspect ratio of the sheets being welded.

5. A method according to claim 4, wherein the phase displacement is 90°.

6. A method according to claim 4, wherein the phase displacement is 120°.

* * * * *